United States Patent
Islam

(10) Patent No.: US 9,869,822 B2
(45) Date of Patent: Jan. 16, 2018

(54) DEVICE FOR DISTRIBUTING HYBRID CABLE AND TRANSITIONING FROM TRUNK CABLE TO JUMPER CABLE

(71) Applicant: CommScope Technologies LLC, Hickory, NC (US)

(72) Inventor: Nahid Islam, Westmont, IL (US)

(73) Assignee: CommScope Technologies LLC, Hickory, NC (US)

( * ) Notice: Subject to any disclaimer, the term of this patent is extended or adjusted under 35 U.S.C. 154(b) by 0 days.

(21) Appl. No.: 15/230,916

(22) Filed: Aug. 8, 2016

(65) Prior Publication Data
US 2017/0045694 A1   Feb. 16, 2017

Related U.S. Application Data

(60) Provisional application No. 62/203,183, filed on Aug. 10, 2015.

(51) Int. Cl.
| G02B 6/36 | (2006.01) |
| G02B 6/38 | (2006.01) |
| G02B 6/44 | (2006.01) |
| H01R 24/38 | (2011.01) |
| H01R 103/00 | (2006.01) |

(52) U.S. Cl.
CPC ......... *G02B 6/3817* (2013.01); *G02B 6/3846* (2013.01); *G02B 6/3865* (2013.01); *G02B 6/4416* (2013.01); *H01R 24/38* (2013.01); *H01R 2103/00* (2013.01)

(58) Field of Classification Search
CPC ...... H01L 2924/00; H01L 2924/00014; G02B 6/4292; G02B 6/4246; G02B 6/4249; G02B 6/36
See application file for complete search history.

(56) References Cited

U.S. PATENT DOCUMENTS

| 2009/0226181 A1 | 9/2009 | Fingler et al. |
| 2013/0108227 A1* | 5/2013 | Conner .............. G02B 6/4471 385/101 |
| 2013/0146355 A1 | 6/2013 | Strasser et al. |
| 2014/0140671 A1 | 5/2014 | Islam |
| 2015/0136439 A1* | 5/2015 | Vaccaro .............. H02G 3/0487 174/91 |
| 2015/0219856 A1 | 8/2015 | Wang |
| 2016/0363731 A1* | 12/2016 | Wang .................. G02B 6/3817 |

FOREIGN PATENT DOCUMENTS

KR   10-2012-0125821 A   11/2012

OTHER PUBLICATIONS

International Search Report and Written Opinion for corresponding PCT Application No. PCT/US2016/045971, dated Oct. 27, 2016, 11 pages.

* cited by examiner

*Primary Examiner* — Jennifer Doan
(74) *Attorney, Agent, or Firm* — Myers Bigel, P.A.

(57) ABSTRACT

A transition device for interconnecting a hybrid trunk cable and electronic equipment includes: an enclosure having first and second ends; a trunk power connector mounted to the first end of the enclosure; a trunk optical connector mounted to the first end of the enclosure; and a plurality of hybrid jumper cables exiting the second end of the enclosure, each of the hybrid jumper cables including at least two power conductors terminated with jumper power connectors and at least one optical fiber terminated with a jumper optical connector.

20 Claims, 4 Drawing Sheets

DEVICE FOR DISTRIBUTING HYBRID CABLE AND TRANSITIONING FROM TRUNK CABLE TO JUMPER CABLE

RELATED APPLICATION

The present application claims priority from and the benefit of U.S. Provisional Patent Application No. 62/203,183, filed Aug. 10, 2015, the disclosure of which is hereby incorporated herein in its entirety.

FIELD OF THE INVENTION

The present invention relates generally to power and signal distribution, and more particularly to distribution from hybrid cables.

BACKGROUND

Latest developments in technology for delivering power and data in wireless infrastructure use hybrid cables, wherein the term "hybrid cable" is intended to mean a cable that includes both power conductors and one or more fiber optic cords or cables. An exemplary hybrid cable is the HFF cable, available from CommScope, Inc. (Joliet, Ill.). Unlike RF-based systems, a single hybrid trunk cable can be used to power multiple sectors, thereby eliminating multiple runs of RF cable. However, in order to use a single hybrid trunk cable, at some point the trunk cable must transition to hybrid jumper cables. Typically, these are distributed inside an enclosure that transitions the trunk conductor gauge to the jumper conductor gauge and connects the optical fibers in the trunk to the optical fibers in the jumper cables. Currently, transitions are achieved by making connections inside the enclosure, requiring it to be opened, cables to be fed/mated to the enclosure, and power and fiber connections to be made, all in the field (e.g., on the top of cell sites near a remote radio unit (RRU)). This practice can create many issues for installers, including time, safety, connection errors (such as loose power connections and/or poor fiber cleaning), and more opportunity for connector damage.

SUMMARY

As a first aspect, embodiments of the invention are directed to a transition device for interconnecting a hybrid trunk cable and electronic equipment, comprising: an enclosure having first and second ends; a trunk power connector mounted to the first end of the enclosure; a trunk optical connector mounted to the first end of the enclosure; and a plurality of hybrid jumper cables exiting the second end of the enclosure, each of the hybrid jumper cables including at least two power conductors terminated with jumper power connectors and at least one optical fiber terminated with a jumper optical connector.

As a second aspect, embodiments of the invention are directed to an assembly comprising: (a) a transition device for interconnecting a hybrid trunk cable and electronic equipment and (b) a hybrid trunk cable. The transition device comprises: an enclosure having first and second ends; a trunk power connector mounted to the first end of the enclosure; a trunk optical connector mounted to the first end of the enclosure; a plurality of hybrid jumper cables exiting the second end of the enclosure, each of the hybrid jumper cables including at least one power conductor terminated with a jumper power connector and at least one optical fiber terminated with a jumper optical connector. The hybrid trunk cable has an optical connector and a power connector, the optical connector of the hybrid trunk cable being connected to the trunk optical connector of the first end of the enclosure, and the power connector of the hybrid trunk cable being connected to the trunk power connector of the first end of the enclosure.

DETAILED DESCRIPTION

The present invention is described with reference to the accompanying drawings, in which certain embodiments of the invention are shown. This invention may, however, be embodied in many different forms and should not be construed as limited to the embodiments that are pictured and described herein; rather, these embodiments are provided so that this disclosure will be thorough and complete, and will fully convey the scope of the invention to those skilled in the art. It will also be appreciated that the embodiments disclosed herein can be combined in any way and/or combination to provide many additional embodiments.

Unless otherwise defined, all technical and scientific terms that are used in this disclosure have the same meaning as commonly understood by one of ordinary skill in the art to which this invention belongs. The terminology used in the below description is for the purpose of describing particular embodiments only and is not intended to be limiting of the invention. As used in this disclosure, the singular forms "a", "an" and "the" are intended to include the plural forms as well, unless the context clearly indicates otherwise. It will also be understood that when an element (e.g., a device, circuit, etc.) is referred to as being "connected" or "coupled" to another element, it can be directly connected or coupled to the other element or intervening elements may be present. In contrast, when an element is referred to as being "directly connected" or "directly coupled" to another element, there are no intervening elements present.

Figure 1:
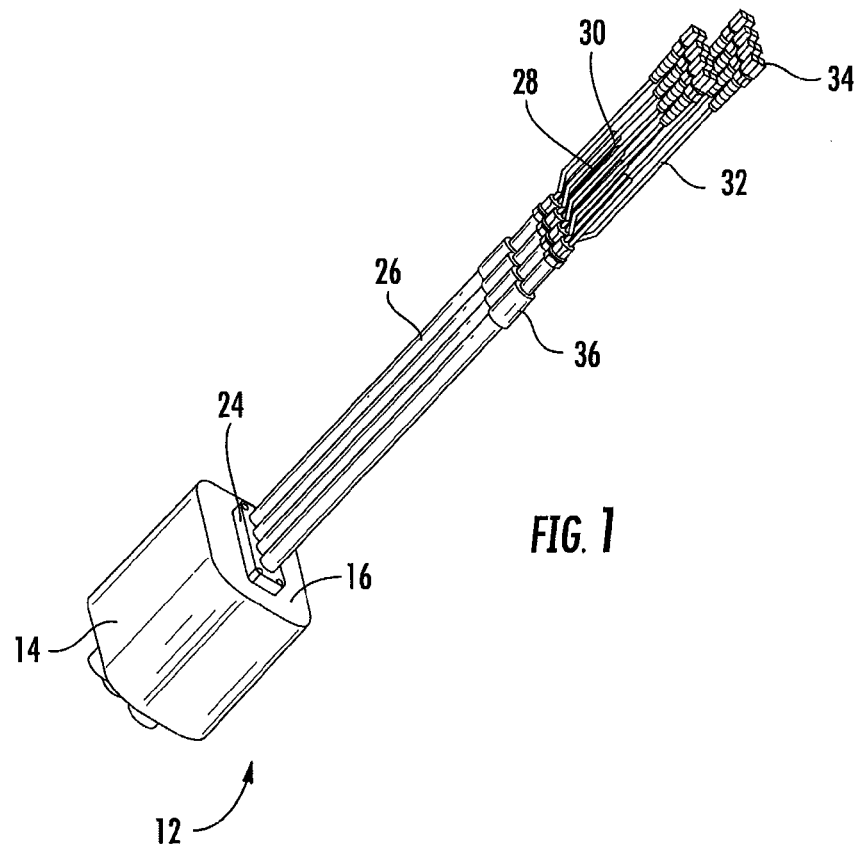
FIG. 1 is a rear perspective view of a transition assembly according to embodiments of the present invention.
Figure 2:
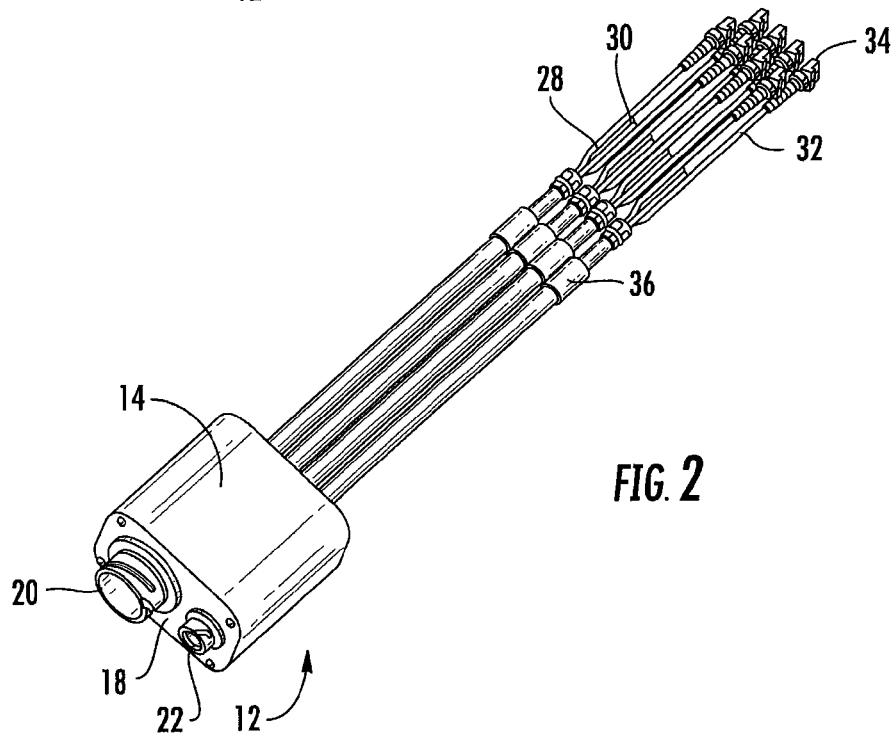
FIG. 2 is a front perspective view of the transition assembly of FIG. 1.
Figure 3:
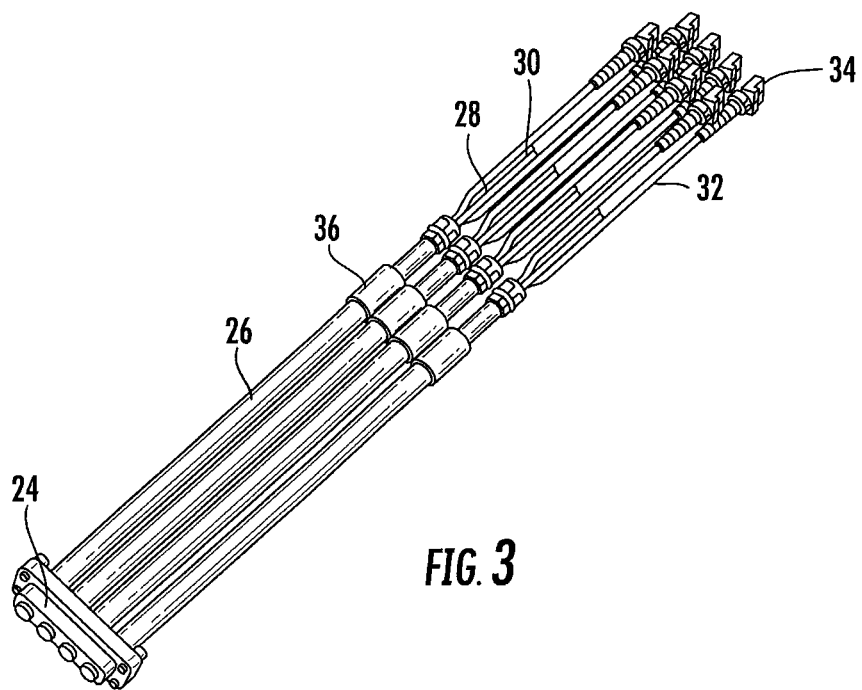
FIG. 3 is a front perspective view of the fixture and bundled hybrid jumper cables of the transition assembly of FIG. 1.

Referring now to the drawings, a transition device, designated broadly at 10, is shown in FIGS. 1 and 2. The transition device 10 includes an enclosure 12 having a housing 14 with a closed end 16. A connector plate 18 fits within the open end of the housing 14 and may be secured to the housing 14 with a gasket or other sealing technique. The connector plate 18 (see FIG. 4) serves as a mounting location for a trunk power connector 20 of conventional construction and a trunk fiber optic connector 22 (which may be an MPO or multi-fiber connector).

Figure 4:
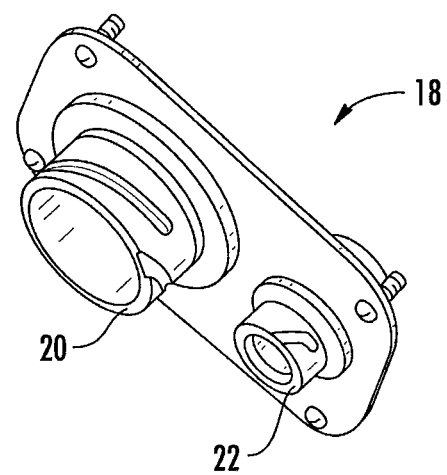
FIG. 4 is a front perspective view of the panel and mounted thereon the trunk optical connector and the trunk power connector of the transition assembly of FIG. 1.
Figure 6:
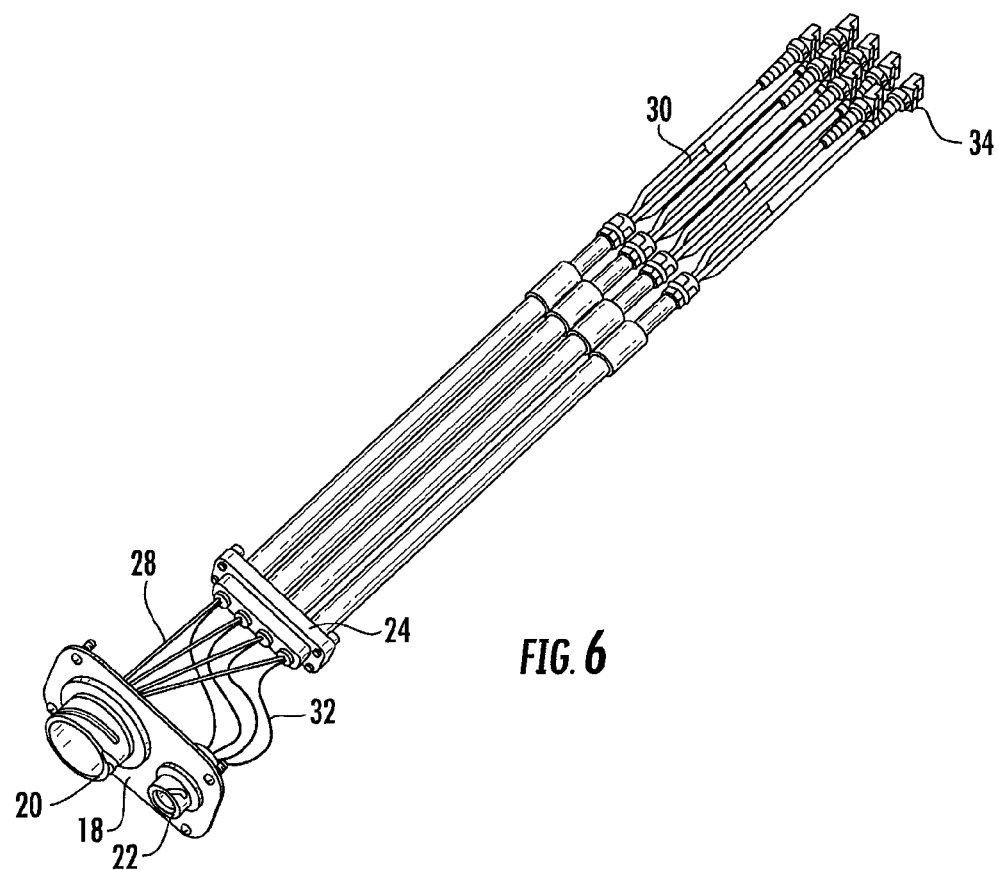
FIG. 6 is a front perspective view of the transition assembly of FIG. 1 with the housing removed.

Referring to FIGS. 1, 4 and 6, the fixture 24 is mounted at the closed end 16 of the housing 14, and may be sealed with a gasket, sealing compound, or the like. The fixture 24 is configured to secure four hybrid jumper cables 26 in a substantially aligned array or bundle. Each of the hybrid jumper cables 26 includes two power conductors 28 that terminate in a jumper power connector 30 and one or more optical fibers 32 that terminates in a jumper optical connector 34. At their opposite ends, the power conductors 28 and the optical fibers 32 of the hybrid jumper cables 26 are connected with the connectors 20, 22 within the enclosure 12 in a conventional manner (see FIG. 6). In the illustrated embodiment, the hybrid cables 26 are bundled together in substantial alignment with a collar 36 some distance from the fixture 24. Typically, the hybrid jumper cables 26 extend between about 0.5 and 50 meter from the enclosure 12, with a length of 0.75 meters being more typical.

Figure 5:
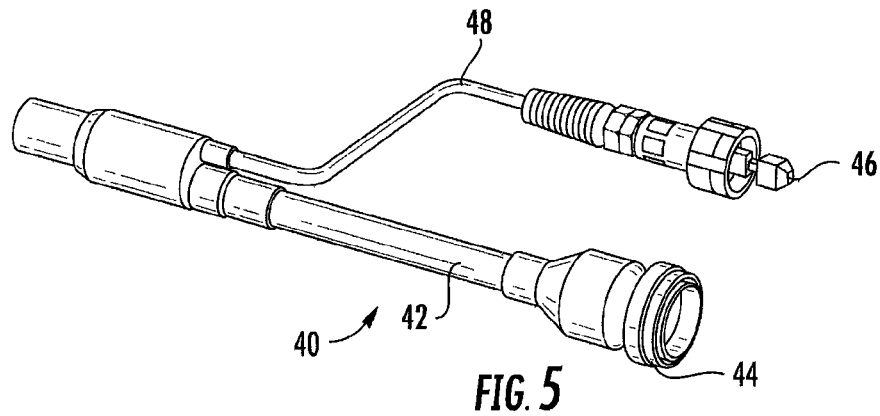
FIG. 5 is a rear perspective view of a hybrid trunk cable with power and optical connectors to be mated with the transition assembly of FIG. 1.

Referring now to FIG. 5, a hybrid trunk cable 40 is illustrated therein. The hybrid trunk cable 40 includes power conductors 42 that are terminated with a power connector 44 and optical fibers 45 that are terminated with an optical connector 46. The power connector 44 is configured to mate with the trunk power connector 20 of the transition device 10, and the optical connector 46 is configured to mate with the trunk optical connector 22 of the transition device 10.

Typically, the hybrid trunk cable 40 is routed from the base of an antenna tower or similar structure to a location adjacent a piece of equipment (such as an RRU) mounted on the structure, where it can be easily mated to the trunk power connector 20 and the trunk optical connector 22 of the transition device 10. The power cables 28 of the hybrid jumper cables 26 are then connected to the equipment via the connectors 30 and the optical fibers 32 are connected to the equipment via the fiber optic connectors 34.

Those of skill in this art will appreciate that the transition device 10 may take other forms. The enclosure 12 may take a different shape. In some embodiments, the enclosure 12 may be partially or completely filled with a potting compound or resin or the like, or may even be formed by overmolding a compound over the power connector 20, optical connector 22 and hybrid cables 26. Other configurations will also be apparent to those of skill in this art.

Moreover, the power connector 20 and optical connector 22 may be replaced by a hybrid trunk connector that mates with a hybrid trunk connector on the hybrid trunk cable. Also, the power and optical connectors 30, 34 on the power and optical jumper cables 28, 32 may be replaced with a hybrid connector.

Figure 7:
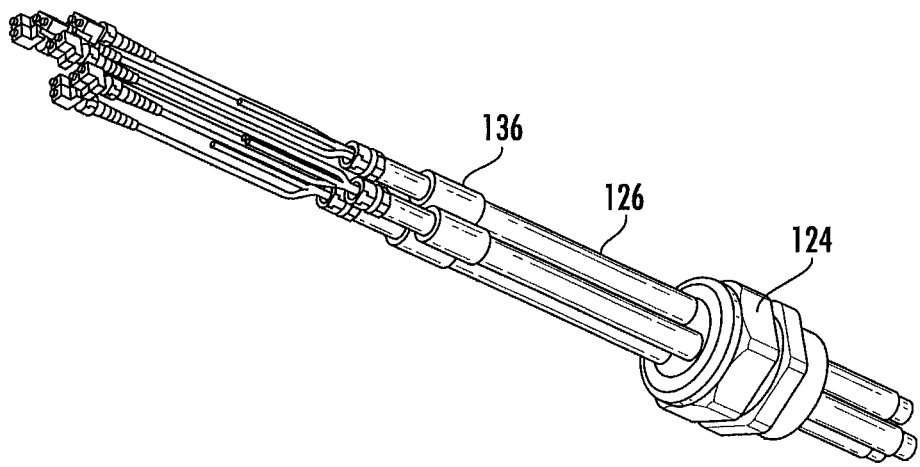
FIG. 7 is a front perspective view of an alternative array of bundled hybrid jumper cables for a transition assembly according to embodiments of the invention.
Figure 8:
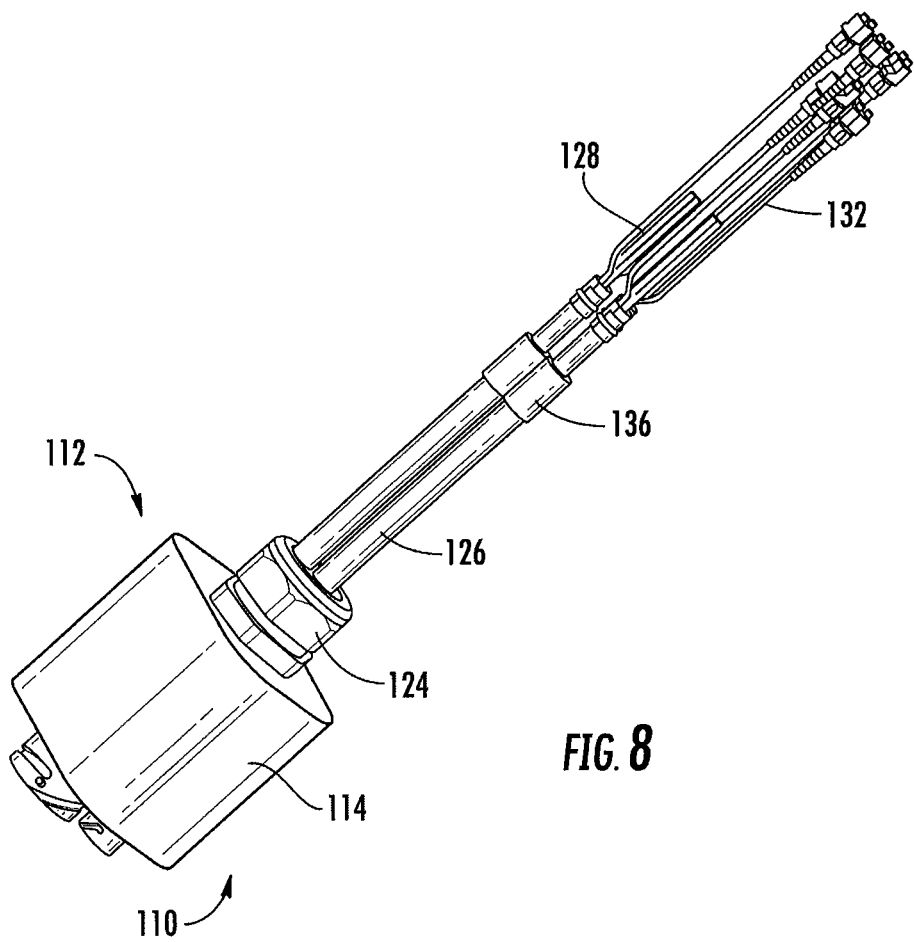
FIG. 8 is a front perspective view of a transition assembly employing the bundled hybrid jumper cables of FIG. 7.

Referring now to FIGS. 7 and 8, an alternative embodiment of a transition device 110 is shown therein. The transition device 110 differs from the transition device 10 in the manner in which the hybrid cables 126 exit the enclosure 112. In the transition device 110, a circular multi-cable gland 124 is mounted on closed end of the housing 114. The hybrid cables 126 are routed from the interior of the enclosure 112 through and away from the gland 124. A square collar 136 maintains the hybrid cables 126 in a bundled fashion prior to their being broken out into power conductors 128 and optical fibers 132.

The foregoing is illustrative of the present invention and is not to be construed as limiting thereof. Although exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. The invention is defined by the following claims, with equivalents of the claims to be included therein.

That which is claimed is:

1. A transition device for Interconnecting a hybrid trunk cable and electronic equipment, comprising:
   an enclosure having first and second ends;
   a trunk power connector mounted to the first end of the enclosure;
   a trunk optical connector mounted to the first end of the enclosure;
   a plurality of hybrid jumper cables exiting the second end of the enclosure, each of the hybrid jumper cables including at least two power conductors terminated with jumper power connectors and at least one optical fiber terminated with a jumper optical connector.

2. The transition device defined in claim 1, wherein the plurality of hybrid jumper cables is bundled as the hybrid jumper cables exit the enclosure.

3. The transition device defined in claim 2, further comprising a collar that bundles the hybrid jumper cables remotely from the enclosure.

4. The transition device defined in claim 1, wherein the plurality of hybrid jumper cables is mounted within a fixture attached to the enclosure.

5. The transition device defined in claim 1, wherein the plurality of hybrid jumper cables extends through a cable gland mounted to the second end of the enclosure.

6. The transition device defined in claim 1, wherein the enclosure is overmolded over the trunk power connector, the trunk optical connector and the plurality of hybrid jumper cables.

7. The transition device defined in claim 1, wherein the second end of the enclosure is opposite the first end of the enclosure.

8. The transition device defined in claim 1, wherein the hybrid jumper cables extend at least 0.5 meter from the enclosure.

9. The transition device defined in claim 1, wherein the trunk power connector is a coaxial connector.

10. The transition device defined in claim 1, wherein the trunk optical connector is a MPO or multi-fiber connector.

11. The transition device defined in claim 1, wherein the trunk power connector is separate and distinct from the trunk optical connector.

12. The transition device defined in claim 1, wherein the trunk power connector and the trunk optical connector are combined in a hybrid trunk connector.

13. The transition device defined in claim 1, wherein the jumper power connectors arc separate and distinct from the jumper optical connectors.

14. An assembly, comprising:
   (a) a transition device for interconnecting a hybrid trunk cable and electronic equipment, comprising:
     an enclosure having first and second ends;
     a trunk power connector mounted to the first end of the enclosure;
     a trunk optical connector mounted to the first end of the enclosure;
     a plurality of hybrid jumper cables exiting the second end of the enclosure, each of the hybrid jumper cables including at least one power conductor terminated with a juniper power connector and at least one optical fiber terminated with a jumper optical connector; and (b) a hybrid trunk cable having an optical connector and a power connector, the optical connector of the hybrid trunk cable being connected to the trunk optical connector of the first end of the enclosure, and the power connector of the hybrid trunk cable being connected to the trunk power connector of the first end of the enclosure.

15. The assembly defined in claim 14, wherein the trunk power connector is separate and distinct from the trunk optical connector.

16. The assembly defined in claim 14, wherein the trunk power connector and the trunk optical connector are combined in a hybrid trunk connector.

17. The assembly defined in claim 14, wherein the jumper power connectors are separate and distinct from the jumper optical connectors.

18. The assembly defined in claim 14, wherein the plurality of hybrid jumper cables is bundled as the hybrid jumper cables exit the enclosure.

19. The assembly defined in claim 15, further comprising a collar that bundles the hybrid jumper cables remotely from the enclosure.

20. The assembly defined in claim 14, wherein the hybrid jumper cables extend at least 0.5 meter from the enclosure.

\* \* \* \* \*

UNITED STATES PATENT AND TRADEMARK OFFICE
CERTIFICATE OF CORRECTION

PATENT NO. : 9,869,822 B2
APPLICATION NO. : 15/230916
DATED : January 16, 2018
INVENTOR(S) : Nahid Islam Page 1 of 1

It is certified that error appears in the above-identified patent and that said Letters Patent is hereby corrected as shown below:

In the Claims

Column 4, Claim 1, Line 7:
Please correct "Interconnecting" to read -- interconnecting --

Column 4, Claim 13, Line 52:
Please correct "arc" to read -- are --

Column 4, Claim 14, Line 65:
Please correct "juniper" to read -- jumper --

Column 5, Claim 16, Line 12:
Please correct "arc" to read -- are --

Signed and Sealed this
Twenty-ninth Day of May, 2018

Andrei Iancu
*Director of the United States Patent and Trademark Office*